Sept. 12, 1967
C. C. BARNHART
3,341,643
METHOD AND APPARATUS FOR THE PREPARATION
OF THERMOPLASTIC RESINOUS FILM
Filed May 13, 1965
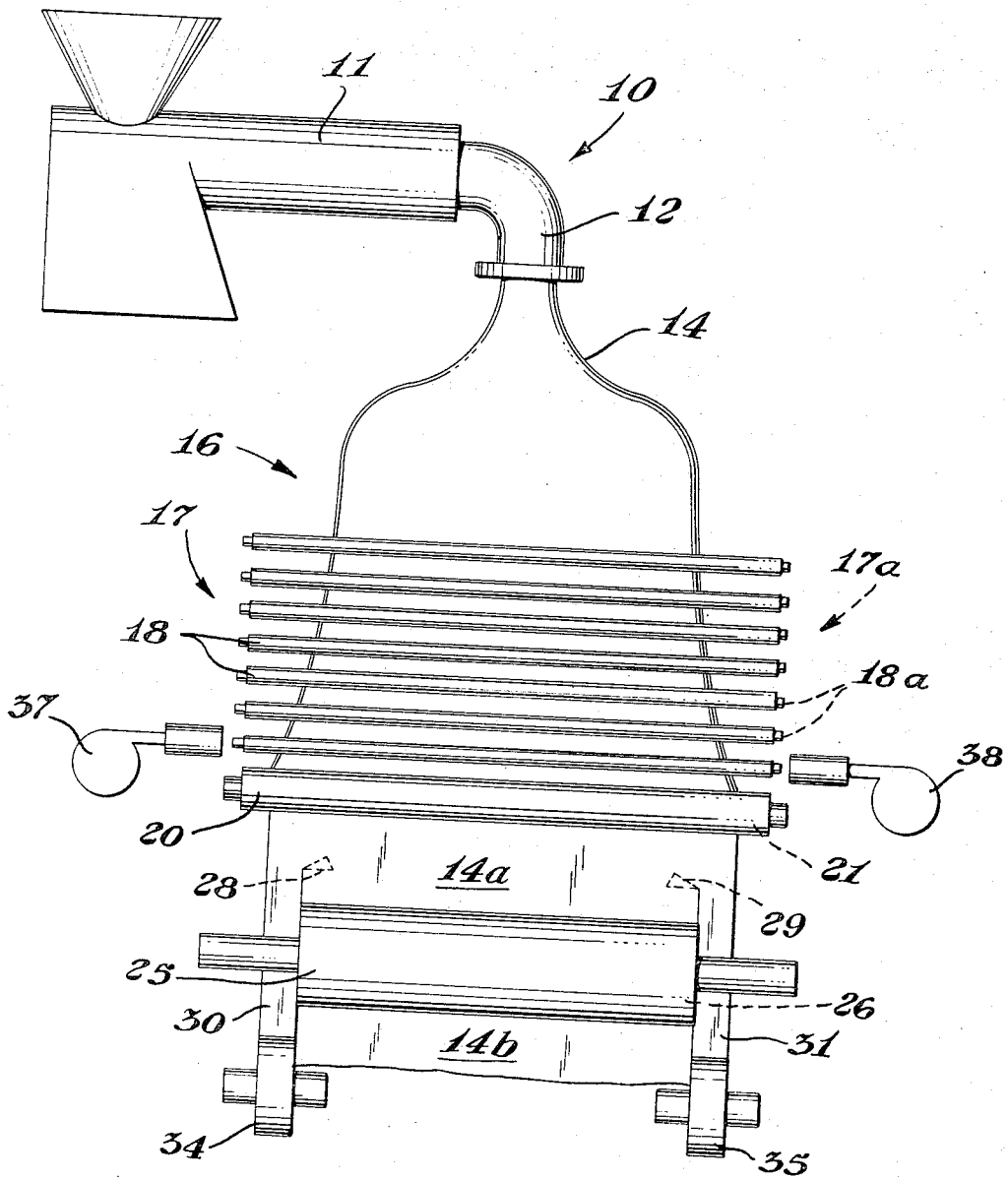
INVENTOR.
Charles C. Barnhart
BY Robert R. Ingraham
AGENT United States Patent Office 3,341,643
Patented Sept. 12, 1967

3,341,643
METHOD AND APPARATUS FOR THE PREPARATION OF THERMOPLASTIC RESINOUS FILM
Charles C. Barnhart, Springfield, Mass., assignor to The Dow Chemical Company, Midland, Mich., a corporation of Delaware
Filed May 13, 1965, Ser. No. 455,393
9 Claims. (Cl. 264—95)

This invention relates to a method and apparatus for the preparation of thermoplastic resinous film. It more particularly relates to a method and apparatus for the preparation of heat shrinkable flat thermoplastic film which results in a reduced edge trim.

In the preparation of thermoplastic resinous film by means of the trapped bubble process which is described and illustrated in United States Letters Patents 2,832,994 and 3,157,720, among others, a tube of deformable thermoplastic resinous material is extruded and expanded by means of a fluid under pressure to orient and stretch the tube. The resultant tube is collapsed to a flattened tube generally by means of a converging or flattening device comprising a plurality of oppositely disposed rolls which serve as a transition section between the circular configuration of the bubble to a linear configuration of a flattened sheet-like tube which is passed between a pair of nip rolls which serve to close the tube and maintain the trapped gas therein. After collapsing the tube and passing it between at least a first set of nip rolls, it is usual to trim the edge portion of the flattened tube and separate the remaining major portion of the flattened tube into a pair of individual sheets which are wound into mill rolls which are later processed by slitting to desired widths for their various end uses.

The portion of the tube removed by the slitting of the edges, if possible, such as in the case of the alkenyl aromatic resinous films or polystyrene type of film is reprocessed. It is essential and critical generally in the commercial operation of such a production facility that the edge trim be maintained at a minimum in order to achieve an economic marketing position. Generally in cases where the flattened tubes, particularly tubes of oriented polystryrene, have a width of about 84 inches, 8 inches are trimmed from each side as waste. Such a broad trim strip is necessary due to formation of wrinkles in the collapsed bubble adjacent the edge portions thereof. Such wrinkled portions, particularly in relatively rigid polymers such as the styrene type polymers, represent a substantial loss in production and additional expense to the cost of producing the film. In cases of rigid polymers the quantity of edge trim is not readily reduced as acceptable and useable film in roll form must be free from wrinkling and obvious irregularities which deviate from a desired cylindrical configuration of the mill roll. It would be particularly advantageous and beneficial if there were available an apparatus and method which would substantially reduce the amount of edge trim necessary in the trapped bubble process of preparing oriented thermoplastic resinous film. It would be further advantageous if by means of a simple modification of existing equipment the amount of edge trim could be substantially reduced. It would also be advantageous and beneficial if a method of extruding, orienting and collapsing an oriented thermoplastic resinous film bubble could be provided which would result in a relatively narrow edge trim.

These features and other advantages in accordance with the present invention are achieved in a method for the production of biaxially oriented thermoplastic synthetic resinous films by means of the trapped bubble process which comprises extruding an orientable synthetic resinous material in a tubular form, inflating the tube by means of internal fluid pressure to expand the diameter of the tube and biaxially orient the tube, cooling the tube to a rigid state, collapsing the tube to a flattened form, the improvement which comprises heating narrow portions of the tube generaly adjacent the edge of the tube immediately prior to flattening to a temperature sufficient to cause shrinkage within the tube.

The method of the invention is advantageously practiced employing the apparatus of the invention which comprises in cooperative combination a tube forming plastics extruder, a pair of pinch rolls disposed with their nip centered generally transversely on the bubble center line, said nip rolls being spaced from the tube forming extruder, a collapsing assembly comprising a pair of generally planar elements disposed adjacent the nip rolls and generally parallel to the axis of the nip rolls, and generally planar elements diverging away from the nip rolls and adapted to be generally symmetrically disposed about a bubble of a thermoplastic resinous material generated by the tube forming plastics extruder, the improvement which comprises means to heat the outermost portions of a partialy collapsed bubble disposed generally adjacent the nip rolls and the collapsing assembly.

Further features and advantages in accordance with the present invention will become more apparent from the following specification taken in connection with the drawing wherein:

The figure is a schematic representation of an extrusion apparatus in accordance with the invention.

In the figure there is illustrated an apparatus generally designated by the reference numeral 10 for the extrusion of oriented synthetic resinous material by the trapped bubble process. The apparatus 10 comprises in cooperative combination a tube forming plastics extruder 11 having an extrusion die 12 particularly adapted to extrude an oriented thermoplastic resinous tube 14, a collapsing assembly generally designated by the reference numeral 16. The collapsing assembly 16 comprises a pair of generally planar elements 17 and 17a. The elements 17 and 17a are composed of a plurality of rolls 18 and 18a, respectively. The rolls 18 and 18a are adapted to rotate about generally parallel axes. The generally planar elements 17 and 17a diverge from each other toward the extrusion die 12. A pair of nip rolls 20 and 21 are disposed generally adjacent the closest portion of the generally planar elements 17 and 17a. The nip rolls 20 and 21 flatten the tube 14 to form the tube 14a. A pair of draw rolls 25 and 26 are disposed in generally parallel relationship to the nip rolls 20 and 21. Disposed between the draw rolls 25 and 26 and the nip rolls 20 and 21 are slitting means or blades 28 and 29 which serve to sever the flattened tube 14a and result in the edge waste portions 30 and 31 which are subsequently rolled onto the waste rolls 34 and 35. The width of the waste portions 30 and 31 is generally commensurate with the edge portion of the flattened tube 14a which exhibits wrinkles. A double layer sheet 14b emerges from the draw rolls remote from the nip rolls. Heating means 37 and 38 are disposed generally adjacent the edges of the partially collapsed bubble 14 generally adjacent the nip of the rolls 20 and 21. The heaters 37 and 38 are adapted to heat the edge portions of the tube 14 to a temperature sufficient to permit shrinkage thereof.

In the practice of the method of the present invention as described with particular reference to the figure, an orientable thermoplastic resinous material is extruded from the tubing die 12 of the extruder 11 whereupon it is inflated by an internal gas pressure to form the tube 14 which is passed downwardly into the converging or deflating apparatus 16 and is subsequently passed between the nip rolls 20 and 21, the edges of the film are trimmed by the slitting means 28 disposed between the draw rolls 25 and 26. The heating means 37 and 38 are adjusted to heat a narrow portion of the film which forms the edges of the bubble 14 as it is being collapsed by the collapsing or deflating means 16 to a temperature sufficiently high to cause shrinkage in the film sufficient to narrow the portion of the flattened tube 14a which exhibits wrinkling or other similar deformities.

The method and apparatus of the present invention are beneficially employed with biaxially oriented thermoplastic materials which shrink at a temperature near or about their thermoplastic temperature. The apparatus and method of the invention are particularly adaptable to oriented thermoplastic resinous materials such as alkenyl aromatic resins.

By an alkenyl aromatic resin is meant a solid polymer of one or more polymerizable alkenyl aromatic compounds. The polymer or copolymer comprises, in chemically combined form, at least 50 percent by weight of at least one alkenyl aromatic compound having the general formula:

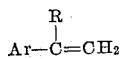

$$Ar-\underset{\underset{R}{|}}{C}=CH_2$$

wherein "Ar" represents an aromatic hydrocarbon radical, or an aromatic halohydrocarbon radical of the benzene series, and "R" is hydrogen or the methyl radical. Examples of such alkenyl aromatic resins are the solid homopolymers of styrene, α-methylstyrene, ortho-methylstyrene, meta - methylstyrene, para - methylstyrene, ar-ethylstyrene, ar-vinylxylene, ar-chlorostyrene, or ar-bromostyrene; the solid copolymers of two or more of such alkenyl aromatic compounds with minor amounts of other readily polymerizable olefinic compounds such as divinylbenzene, methyl methacrylate, or acrylonitrile, etc. Oriented polyolefin films such as oriented polyethylene, polypropylene and oriented resinous copolymers thereof, polyvinyl chloride, orientable sarans such as copolymers of about 15 weight percent vinylchloride and 85 weight percent vinylidene chloride, and the like, are particularly adaptable to the apparatus and method of the present invention also.

A wide variety of heating means may be utilized for the practice of the present invention. Generally, however, it is most advantageous to employ heated fluid such as hot air which may be blown in a directed jet against the desired portions of the bubble and the temperature thereof readily regulated and controlled. Oftentimes it is desirable to employ radiant heaters such as are formed from resistance wire and the like and to readily be fabricated into any desired fabrication. If desired, the heated fluid such as steam generally at superatmospheric pressure can be directed at the desired edge portions of the bubble adjacent the nip roll. However, steam has the disadvantage of forming condensate and necessitating drying of the waste or trim prior to the processing.

By way of further illustration, a 1.5 mil thick bubble of polystyrene was prepared in the manner disclosed in United States Letters Patent 2,832,994 to result in a flattened tube having a width of about 84 inches. The wrinkled or distorted portion of the tube was 8 inches which was trimmed and discarded as scrap. Air blasts about 2 inches in diameter having a temperature of about 115° centigrade and a flow of about 100 cubic feet per minute each were directed at the edges of the collapsing bubble at a distance of about 6 inches above the nip roll. The hot air blasts were positioned so that the obvious shrinkage of the edge portions of the bubble took place, the edge wrinkling was reduced, and the edge trim necessary was only 2 inches from each side. Thus the amount of waste was reduced by a factor of 4. Similar beneficial and advantageous results are achieved when the hot air blast is replaced with steam or radiant heat which is sufficient to cause obvious shrinkage of the collapsing bubble.

In the manner of the foregoing illustration, similar beneficial and advantageous results are achieved in the bubble extrusion of polyethylene, polypropylene, polyvinyl chloride, copolymer of 75 parts by weight styrene and 25 parts by weight methyl acrylate, polyvinyl toluene, polytertiarybutyl styrene, a copolymer of 85 parts by weight vinyl chloride and 15 parts by weight ethyl acrylate.

As is apparent from the foregoing specification, the apparatus and method of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In a method for the production of biaxially orientated heat shrinkable thermoplastic synthetic resinous film, by means of the trapped bubble process comprising,
   an orientable synthetic resinous material in a tubular form,
   inflating the tube by means of internal fluid pressure sufficient to distend and biaxially orient the tube,
   cooling the tube to a temperature below its thermoplastic temperature,
   collapsing the tube to a flattened form,
   the improvement which comprises,
   heating narrow portions of the tube generally adjacent the edge of the partially flattened tube immediately adjacent to complete flattening of the tube, to a temperature sufficient to cause heat shrinkage of a narrow portion of the almost completely collapsed bubble, the heat shrunk portion of the bubble corresponding to to the edges of the flattened tube.

2. The method of claim 1, wherein the tube is heated by hot air.

3. The method of claim 2, wherein hot air is applied to the tube in the form of relatively narrow air blasts.

4. The method of claim 1 wherein the thermoplastic resinous material is an alkenyl aromatic resin.

5. The method of claim 4, wherein the alkenyl aromatic resin is polystyrene.
   and heating of the tube is sufficient to cause significant reduction in the wrinkled area of the flattened tube obtained when heating is not employed.

6. In an apparatus for the production of heat shrinkable synthetic resinous thermoplastic film by means of the trapped bubble process comprising in cooperative combination a tube forming plastics extruder, a pair of pinch rolls disposed with their nip centered generally transversely on the bubble center line, the nip rolls being spaced from the tube forming extruder, a collapsing assembly comprising a pair of generally planar elements disposed adjacent the nip rolls and generally parallel to the axis of the nip rolls, the generally planar elements diverging from the nip rolls and adapted to be generally symmetrically disposed about a bubble of a thermoplastic resinous material generated by the tube forming plastic extruder, the improvement which comprises means to heat the edge portions of a partially collapsed bubble disposed adjacent the nip rolls and collapsing assembly to a temperature sufficient to cause shrinkage therein.

7. The apparatus of claim 6, including means to trim the edge portion of a flattened tube prepared by the apparatus.

8. The apparatus of claim 6, wherein the means to heat the bubble comprises a pair of hot gas sources.

9. The apparatus of claim 8, wherein the hot gas sources comprise means to supply a narrow blast of hot air directed toward the bubble edge.

References Cited

UNITED STATES PATENTS

| | | | |
|---|---|---|---|
| 2,697,852 | 12/1954 | Bailey | 264—95 |
| 2,955,318 | 10/1960 | Cook et al. | 264—95 X |
| 3,061,876 | 11/1962 | Lloyd et al. | 264—95 |
| 3,170,012 | 2/1965 | Stinschombe | 264—95 |
| 3,257,489 | 6/1966 | Heffelfinger | 264—95 X |

FOREIGN PATENTS 219,106  12/1958  Australia.

ROBERT F. WHITE, *Primary Examiner.*

A. R. NOË, *Assistant Examiner.*